July 7, 1936.  R. J. KAMDRON ET AL  2,046,635
NAUTICAL SIGNALING DEVICE
Filed Nov. 5, 1928   2 Sheets-Sheet 1
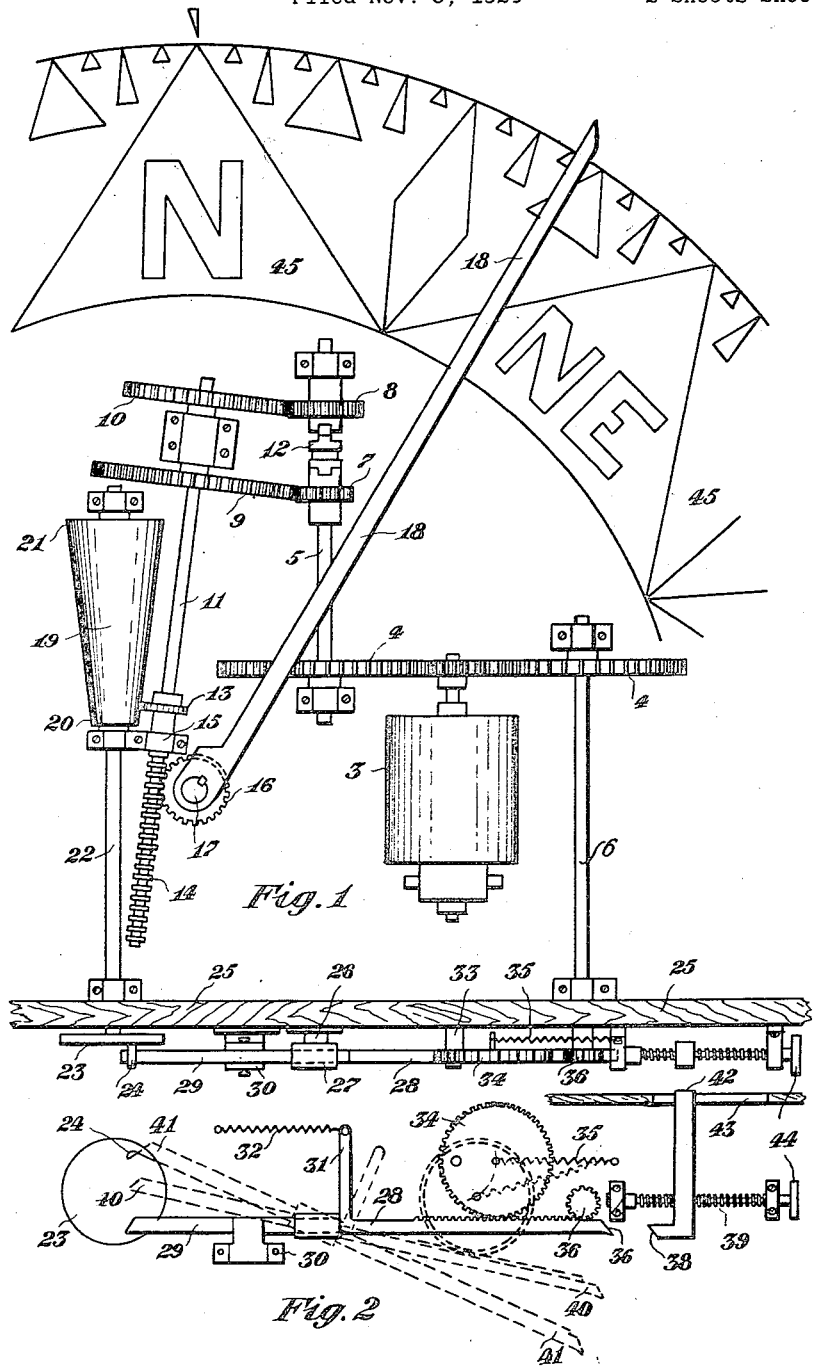
R. J. Kamdron
G. A. Stavrakov
Inventor
Attorney July 7, 1936.  R. J. KAMDRON ET AL  2,046,635
NAUTICAL SIGNALING DEVICE
Filed Nov. 5, 1923  2 Sheets-Sheet 2

R. J. Kamdron
G. A. Stavrakov
Inventors

Attorney

Patented July 7, 1936

2,046,635

UNITED STATES PATENT OFFICE 2,046,635

NAUTICAL SIGNALING DEVICE

Robert Jacob Kamdron, Seattle, Wash., and George Alexander Stavrakov, Victoria, British Columbia, Canada Application November 5, 1928, Serial No. 317,413

5 Claims. (Cl. 177—352)

This invention relates to improvements in nautical signaling devices, particularly for use during atmospheric conditions of low visibility due to fog, snow, hail and the like obscuring phenomena. Its object is to provide for the use of sea-going and all other types of water borne craft, simple, effective and easily applied means whereby the present appalling loss of life and property due to collisions between such craft may be in large part eliminated.

Hitherto no adequate and sufficiently simple means have been devised to safeguard from collision two mutually approaching vessels and such devices as have been suggested have been either too complex or too slow, thus requiring the expenditure of invaluable time during the critical moments, and therefore have not been put into practice. This absence of effective means during the vital moments of an emergency is responsible for an immense loss of time incurred by vessels endeavouring to avoid collisions when entering and leaving busy ports during fog. This loss owing to the increasing size and value of ships and cargo now reaches a value per hour which calls for urgent attention on economic grounds, and our invention provides a thoroughly practical remedy for this condition of loss.

Our invention or discovery comprises means whereby the knowledge of the course and of the approximate speed of a ship may be immediately conveyed to all other ships within hearing distance or in the vicinity or within the radius of effect of the apparatus involved.

The basic factor of our device resides in the co-ordination of a signal code (such as may be afforded by whistle blasts or by electrical impulses as the case may be), with the measurement of time and with the angular measurement of the compass card. By this combination we are able to obtain or impart definite and sufficiently exact information as to a ship's course and this knowledge is available to every vessel in the vicinity.

In order to effectively and efficiently realize the advantages of the device we adopt preferentially apparatus such as is hereinafter described in detail, but before reaching this stage we deem it advisable to make clear the application of the principle of our device to actual practice.

The angular calibration or measurement of the compass card as applied to the entire circle is well known and in common application with certain instruments and in our device a stop watch dial is similarly divided so that one minute registered by its index is equivalent to 360 degrees of the compass card; thus we institute a direct comparison between duration and angularity, which enables us to read duration in terms of angularity, or a ship's course in degrees of deviation from the magnetic north point merely by the time interval between successive signals.

The reason for this is apparent seeing that the compass card representing the horizontal plane is divided into 360 degrees, and starting from the north as zero and proceeding in a clockwise direction a ship's course is defined in degrees as the angular distance of its bow from the north point.

Taking a simple example for illustration and assuming that the periodicity in seconds of a whistle blast indicates in corresponding degrees the course of a vessel, we might have successive blasts at intervals of 15 seconds which would correspond to 90 degrees on the dial of the stop watch and also on the compass and indicate the ship's course as being in a due easterly direction. It is obvious, however, that such an arrangement would be unsuitable because if the course had been say north by east (11¼ degrees), the whistle blast would require to be at intervals of less than 2 seconds, and hence impracticable as so short an interval between blasts would give no time for listening to other ships that might be near and would be otherwise impossible because the blast prescribed by international regulations must be of 4 to 6 seconds duration.

It is obvious however that this defect offers no limitations to the utility of our device which readily lends itself to the adoption of existing legal signal codes as well as any which may be devised to meet future exigencies.

For instance, still following out the elementary example cited, we may provide intervals of silence of 30 seconds and 60 seconds respectively and add either of these to the time periodicity of each blast. This affords two series of signals the first of which might advantageously be used for fast moving vessels and the second for slower craft. We provide for the former case by making two scales on our said stop watch dial, one of which has the second half of the circumference sub-divided into 360 degrees, thus giving to that portion of the scale a double angular value per second, so that every second in time is equivalent to 12 angular degrees on the compass card. By this device the periodicity of the signals is always within one minute or within two minutes, in the former case a fast moving vessel is involved, and time being more important quicker recurring signals are necessary. Thus continuing the example but re-applying the same—a fast ship steering due east would signal at intervals of 37½ seconds, i. e., using a blank interval of 30 seconds: the difference 7½ seconds × 12 indicating the course, viz:—90 degrees or due east. When a ship is using our device its course expressed in degrees may be ascertained with the aid of an ordinary stop watch by simply multiplying the number of seconds elapsed between the commencement or the cessation of two successive blasts less 60 seconds if the interval is over one minute, or less thirty seconds if it is less than one minute, by 6 or 12 respectively; the first numeral being the ratio between the angular values of one degree of the compass to one second of the stop watch dial and the second being the ratio of one degree of the compass to the angle corresponding to one half of a second on the dial of the stop watch. By interpolating the international or any code we arrange to give any prescribed value to the duration and periodicity of the blasts, and have accordingly devised an apparatus adapted for automatically producing, with the necessary precision, the required whistle blasts or other signals. These signals should have the periodicity and duration demanded by such a before mentioned code, which forms a salient part of our invention. It would be very difficult and in practice physically impossible to correctly utilize our invention without such precision apparatus to give proper effect to it. In addition to the necessary apparatus for sending signals we have also devised a convenient instrument for instantly interpreting the received signals, this consists of a modified stop-watch dial having four co-ordinated scales which are read with one pivotal index.

Our device in its more complete form is better described by the aid of the drawings which accompany and form a part of this application, and in which Fig. 1 is a schematic plan view of suitable apparatus for controlling a solenoid actuating a ship's whistle or other signaling device, in accordance with our invention, and indicates in particular a mode of obtaining variable speeds to produce the whistle blasts at the exact intervals required as called for in our device.

Fig. 2 is a side elevation of Fig. 1, and shows particularly mechanism for regulating the duration of the periodic whistle blasts or other signals.

Figure 3:
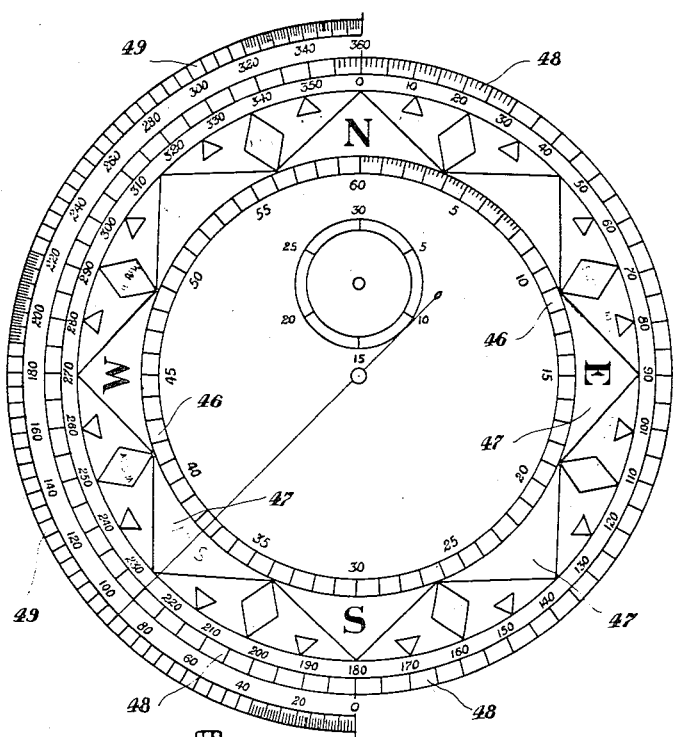
Fig. 3 is a front elevation or face view of a chronograph dial as modified to meet the requirements of our signaling device.
Figure 4:
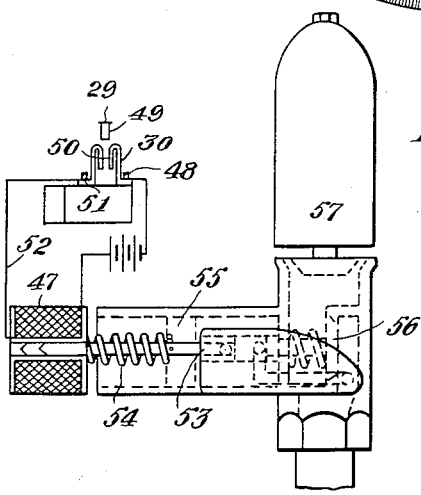
Fig. 4 shows a fluid actuated whistle controlled by a solenoid in circuit with a switch and battery.

In these drawings the numeral 3 indicates an electric motor running at a constant speed and driving through suitable gearing 4 the spindles 5 and 6. The spindle 5 carries the gear wheels 7 and 8 which are freely revolvable on it and are always in mesh with the gear wheels 9 and 10, the latter being keyed to the spindle 11. By means of a jaw clutch 12 slidably keyed on the spindle 5 either of the gears 7 and 8 may be engaged with the spindle 5 thereby causing the spindle 11 to revolve at a rate of either one revolution in thirty seconds, or one revolution in sixty seconds. The two speed spindle 11 has keyed to it the friction pulley 13 and is made of square cross section from the pulley 13 to its extremity beyond the gear wheels 9 and 10, and at the other end has a circular rack 14 which is slidable longitudinally in its bearing 15 and engages the pinion 16 which is keyed to the spindle 17 of the index 18 by angular movement of which the pinion 16 may be rotated and the rack 14 with the squared spindle 11 reciprocated in its bearings and through the bosses of the gear wheels 9 and 10, thus giving traverse to the friction pulley 13 along the surface of the cone member 19. This latter is so proportioned that its diameters at 20 and 21 are in the ratio of one to two respectively.

From this arrangement it will be seen that by shifting the driving pulley 13 along the side of the conical member 19 the latter may be varied in speed of rotation within the limits of the ratios of one to one, and one to two of the speed of the pulley 13, and as the latter is driven at a constant speed of either one revolution in thirty seconds or one revolution in sixty seconds, it follows that by shifting the driving pulley 13 along the cone member 19, the latter may be caused to make one revolution in any period of time from thirty seconds to one minute with one set of gearing, and from one minute to two minutes with the other set of gearing.

The cone member 19 is keyed to the variable speed spindle 22 which carries on its outer extremity the crank disc 23 with overhanging pin 24 projecting from its face.

The member 25 indicates a vertical support which may be a partition in the box housing the instrument and serves to carry the stud 26 for the pivotal bearing 27 through which the rack bar 28 slides. The extremity of the bar 28 opposite to the rack forms the contacting blade 29 of the knife switch 30, and at its extremity also serves to intermittently contact the revolving pin 24. A projecting arm 31 secured right angularly to the rack bar 28 is restrained by the helical extension spring 32 to which it is engaged, and by which it is returned to abut against the pivoted guide 27 when otherwise disengaged. A second stud 33 carries the pivot of the circular and eccentrically mounted toothed cam 34 which engages the rack bar 28 and is subject to the action of the helical extension spring 35 secured to its centre and to the side of the member 25, which spring functions to reposition the toothed cam 34 when the latter becomes disengaged from the rack bar 28 by the lifting action of the pin 24.

The extremity of the spindle 6 beyond the support 25 is keyed to the pinion 36 which is adapted to engage the rack bar 28 and revolves at a constant speed in an anticlockwise direction, as also does the disc 23 at the extreme left of the instrument. It will be noted that the trip mechanism at the end of the rack consists of two opposing inclined planes, one of which terminates the bar 28 at 37, this latter by slidable engagement with the corresponding inclination at 38 on the screw adjustable trip stop 39 is depressed so as to disengage the rack from the pinion 36, but the cam 34 still remains in mesh with the rack which is drawn towards the stud 26 by the spring 32. Meanwhile the linear motion of the rack imparts a circular motion to the eccentrically pivoted toothed cam 34 until the latter has depressed the rack end of the bar 28 sufficiently to throw its smooth end or blade 29 out of contact with the fork of the switch 30. The rack bar 28 is then in the position shown at 40 where it remains until, by the revolution of the disc 23, the pin 24 contacts the end of the bar 28 and lifts it to the position shown at 41. This action releases the toothed cam 34 which is returned by the spring 35 to its original position. The trip stop 39 is extended at 42 to form an index above the housing and which traverses the slot 43, the stop is adjustable by the knurled head 44. The index 18 secured at the top extremity of the spindle 17 sweeps the entire circular scale of the compass card 45, this latter is preferably divided into 360 degrees numbered consecutively in a clock-wise direction.

A preferred arrangement of the stop watch dial used for interpreting the received signals is shown in Fig. 3, and consists of four concentric scales co-ordinated to become operative with the aid of one central pivoted pointer or hand. A preferred arrangement is indicated in which a time dial forms the central scale 46 being an entire circle for one minute, this is used in connection with the usual pointer or hand stop, dial and fly-back mechanism. Adjacent this is the usual compass card 47, which is surrounded by a complete circle 48 divided into 360 degrees of angular measurement, whilst the outer left hand semi-circle 49 is similarly divided into 360 degrees.

The operation of the device may be summarized as follows:

Assuming that a slow moving ship is steering a due easterly course, the jaw clutch 12 is connected to revolve the gear wheels 7 and 9 by which the spindle 11 is given a speed of one revolution per minute, and the index 18 is set due east or at an angle of 90 degrees. Under these conditions the whistle blasts or other signals would be at time intervals of 75 seconds, being 60 seconds blank plus 15 seconds as equivalent to 90 degrees—following the previous example. The positioning of the index 18 will actuate the rack 28 whereby the pulley 13 is moved along the cone 19 to a position which will cause the spindle 22, the disc 23, and the pin 24 to make one revolution in 75 seconds.

It will be seen that this portion of the mechanism controls the time interval of the signals, due to the fact that pin 24 contacts the switch blade end 29 of the slidable pivoting rack 28 once every revolution or at a frequency of 75 seconds, and by this action correspondingly causes the switch 30 controlling the signal operating solenoid circuit to be opened at that interval. The period during which the switch 30 remains closed, and which corresponds to the duration of the signal is controlled and adjusted as follows:

The pinion 36 revolves in an anti-clockwise direction at a constant speed, and the trip index 42 has been adjusted to permit a signal duration of say 4 seconds, the pivoting blade 29 has just fallen into contact with the switch 30, and the rack 28 has engaged the pinion 36. Linear motion is imparted to the rack bar 28 by the pinion 36 against the action of the spring 32 until the inclination 37 is depressed by contact with the inclination 38 by which it is released from meshing with the pinion, but not from meshing with the toothed pawl 34.

The bar 28 then comes under the effect of the spring 32 and slides through the pivotal bearing 27 until the arm 31 contacts the bearing 27, this linear motion of the rack 28 still in mesh with the circular and eccentrically mounted pawl 34 imparts to it a circular motion which depresses the bar 28 to the intermediate position at 40 and raises the blade 29 thus opening the switch 30.

The rack bar 28 and pawl 34 remain at rest in this position—the duration of the signal having thus been determined—until the revolving pin 24 moving anti-clockwise contacts and lifts the extremity of the blade 29 thus depressing the rack 28 and releasing from engagement with it the pawl 34 which latter is returned to its original position by the action of the spring 35.

This completes the cycle, the mechanism having effected a signal having four seconds duration and a time interval of seventy-five seconds, and has indicated to other ships in the vicinity, the presence of a slow moving vessel in the direction of the signal which is steering a due easterly course. It is at this point that the stop watch frequently referred to in the specification—or less conveniently any stop watch, comes into use. Immediately signal blasts are noticed, the index of the watch is started from zero or the north point, at the end of any blast and stopped at the end of the next blast. If this period is more than 60 seconds, then 60 seconds are deducted from the registered period and the remainder multiplied by 6 equals the angularity in degrees of the course of the ship signaling. Should the period of the observed blasts be less than 60 seconds, then 30 seconds are deducted and the remainder multiplied by 12 similarly gives the ship's course—with the further indication that it is a fast moving vessel. And following to completion the original example ships in the vicinity noting the signals have observed the time intervals to be seventy-five seconds, and have read on their modified stop watch dials that the course of the ship signaling is in a due easterly direction.

What we claim as our invention and desire to secure by Letters Patent, is:

1. In fog signaling apparatus of the type in which the course of a ship is broadcast to other ships in its vicinity by means of sound blasts which convey by code systems information regarding the angular direction of such course as related to the north point, means comprising a fog-whistle, an angularly divided compass dial with a centrally pivoted index revolvable thereon, a timing spindle revolved at a substantially constant speed, an electric switch connected to means for operating said whistle to produce a blast of fixed length, a switch spindle with means for intermittently opening and closing said switch contacts once per revolution of said switch spindle, gradually-variable speed-ratio driving means between the said two spindles coacting with and operated by said index, whereby upon setting said switch spindle to revolve at a desired speed and positioning said index at the north point on said dial blasts will be emitted at intervals corresponding to once per revolution of said switch spindle, and when said index is positioned at any other angular position on said dial the said intervals will be lengthened in direct proportion to the angular distance of the index from the north point on the dial.

2. In a fog signaling apparatus for ships, a fog-whistle means for operating said whistle to produce a blast of fixed length periodically, a dial graduated in accordance with the points of the compass, a pivoted index cooperating with the dial graduations and means operated by said pointer and cooperating with said first named means, for varying the period between the blasts in direct proportion to the angular distance of the pointer from the north point on the dial.

3. In a fog signaling apparatus for ships, a fog-whistle, means for operating said whistle to produce a blast of fixed length periodically, a dial graduated in accordance with the points of the compass, a pivoted index cooperating with the dial graduations and means operated by said index and cooperating with said first named means, for lengthening the periodicity of said blasts in direct proportion to the angular distance of said index from the north point on said dial.

4. In a fog signaling apparatus for ships, a fog-whistle, means for operating said whistle to produce a blast periodically, a dial graduated in accordance with the points of the compass, a pivoted index cooperating with the dial graduations and means operated by said index and cooperating with said first named means, for lengthening the silent period between said blasts in direct proportion to the angular distance of said index from the north point on the dial.

5. In a fog signaling apparatus for ships, radiant energy signaling means, means for operating said radiant energy signaling apparatus to produce signals periodically, a dial graduated in accordance with the points of the compass, a pivoted index cooperating with the dial graduations and means operated by said index and cooperating with said first named means, for lengthening the silent period between said blasts in direct proportion to the angular distance of said index from the north point on the dial.

ROBERT JACOB KAMDRON.
GEORGE ALEXANDER STAVRAKOV.